United States Patent
Barksby et al.

(10) Patent No.: US 6,420,445 B1
(45) Date of Patent: Jul. 16, 2002

(54) POLYURETHANE AND POLYURETHANE/UREA HEAT-CURED AND MOISTURE-CURED ELASTOMERS WITH IMPROVED PHYSICAL PROPERTIES

(75) Inventors: Nigel Barksby, Dunbar; Bruce D. Lawrey, Charleston, both of WV (US); Susan M. Clift, Lansdale, PA (US)

(73) Assignee: Bayer Antwerp N.V., Antwerpen (BE)

( * ) Notice: Subject to any disclaimer, the term of this patent is extended or adjusted under 35 U.S.C. 154(b) by 0 days.

(21) Appl. No.: 09/487,087

(22) Filed: Jan. 19, 2000

Related U.S. Application Data

(63) Continuation of application No. 08/985,712, filed on Dec. 5, 1997, now abandoned.

(51) Int. Cl.[7] .............................. C08J 9/04; C08J 9/08; C08J 9/12; C08G 18/12; C08G 18/48
(52) U.S. Cl. ..................... 521/159; 521/130; 521/160; 521/176; 521/174; 528/59; 528/61; 528/64; 528/65; 528/63; 528/67; 528/76; 528/60
(58) Field of Search ................................ 521/130, 159, 521/160, 176, 174; 528/59, 61, 64, 65, 63, 67, 76, 60

(56) References Cited

U.S. PATENT DOCUMENTS

| | | | |
|---|---|---|---|
| 3,393,243 A | 7/1968 | Cuscurida | 568/620 |
| 3,427,256 A | 2/1969 | Milgrom | 252/431 |
| 3,427,334 A | 2/1969 | Belmar | 556/31 |
| 3,427,335 A | 2/1969 | Herold | 549/206 |
| 3,829,505 A | 8/1974 | Herold | 568/606 |
| 3,941,849 A | 3/1976 | Herold | 528/92 |
| 3,963,681 A | 6/1976 | Kaneko et al. | 528/61 |
| 4,239,879 A | 12/1980 | Fabris et al. | 528/76 |
| 4,282,387 A | 8/1981 | Olstowski et al. | 568/618 |
| 4,687,851 A | 8/1987 | Laughner | 544/398 |
| 4,934,425 A | 6/1990 | Gajewski et al. | 152/323 |
| 4,985,491 A | 1/1991 | Reisch | 524/875 |
| 5,010,117 A | 4/1991 | Herrington et al. | 521/159 |
| 5,010,187 A | 4/1991 | Heuvelsland | 536/120 |
| 5,077,371 A | 12/1991 | Singh et al. | 528/64 |
| 5,096,993 A | 3/1992 | Smith et al. | 528/61 |
| 5,100,997 A | 3/1992 | Reisch et al. | 528/60 |
| 5,114,619 A | 5/1992 | Heuvelsland | 252/182.27 |
| 5,116,931 A | 5/1992 | Reisch et al. | 528/59 |
| 5,136,010 A | 8/1992 | Reisch et al. | 528/75 |
| 5,185,420 A | 2/1993 | Smith et al. | 528/61 |
| 5,648,447 A | 7/1997 | Seneker et al. | 528/63 |
| 5,670,601 A | 9/1997 | Allen et al. | 528/76 |
| 5,677,413 A | 10/1997 | Barksby et al. | 528/65 |
| 5,691,441 A | 11/1997 | Seneker et al. | 528/61 |
| 5,696,221 A | 12/1997 | Barksby et al. | 528/64 |
| 5,708,118 A | 1/1998 | Seneker et al. | 528/61 |
| 5,723,563 A | 3/1998 | Lawrey | 528/61 |
| 5,728,745 A | 3/1998 | Allen et al. | 521/159 |
| 5,843,357 A | 12/1998 | Seneker et al. | 264/204 |
| 5,856,372 A * | 1/1999 | Ho et al. | 521/159 |

OTHER PUBLICATIONS

A.T. Chen, R.R. Wells, C.P. Smith, J.W. Reisch, M.M. Emmetand, J.M. O'Connor, Polyurethanes World Congress 1993, Oct. 10–13, 1993, pp. 388–399.

R.L. Mascioli, 32$^{nd}$ Annual Polyurethane Technical Marketing Conference, Oct. 1–4, 1989, pp. 139–142.

* cited by examiner

*Primary Examiner*—Rabon Sergent
(74) *Attorney, Agent, or Firm*—Brooks & Kushman P.C.

(57) ABSTRACT

Elastomers with improved physical properties, particularly hardness, resilience, tear strength, and compression set, may be prepared by the chain extension or moisture cure of isocyanate-terminated prepolymers prepared from a polyol component comprising a high molecular weight, low unsaturation polyoxypropylene diol and a low molecular weight diol. The elastomers are useful for applications such as rollers and other applications for which these physical properties are important.

28 Claims, No Drawings

POLYURETHANE AND POLYURETHANE/UREA HEAT-CURED AND MOISTURE-CURED ELASTOMERS WITH IMPROVED PHYSICAL PROPERTIES

This application is a continuation of U.S application Ser. No. 08/985,712, now abandoned, filed Dec. 5, 1997 to which priority is claimed.

TECHNICAL FIELD

The present invention pertains to polyurethene and polyurethane/urea heat-cured elastomers prepared by the chain extension or moisture cure of isocyanate-terminated prepolymers. More particularly, the present invention pertains to prepolymers prepared by reacting a stoichiometric excess of a di- or polyisocyanate (other than toluene diisocyanate) with a polyol component comprising a high molecular weight, low unsaturation polyoxypropylene polyol and a very low molecular weight polyol. The subject elastomers have improved hardness, resilience, tear strength, and compression set compared with otherwise similar elastomers having the same hard segment content. Films prepared from the compositions have exceptional tensile and tear strengths.

BACKGROUND ART

Polyurethane heat-cured elastomers may, in general, be subdivided into two major classes distinguished by the type of monomeric isocyanate used to prepare the elastomer precursor prepolymer. When methylene diphenylene diisocyanate (MDI) or MDI variants are used to form the prepolymers, the isocyanate group to polyol hydroxyl equivalent ratio may be quite high. The range of isocyanate group content possible provides flexibility in formulating. However, the high reactivity of the MDI isocyanate groups generally requires use of diol chain extenders in cast elastomer systems, as amines with suitable reactivity are not commercially available. To maintain a desirable balance of properties, elastomers prepared from MDI are thus polyurethane elastomers and not polyurethane/urea elastomers which have a distinct status in the art.

Heat-cured polyurethane/urea elastomers should not be confused with reaction injection molded polyurethane/urea (RIM) systems. In the latter, MDI and modified MDIs are generally used in conjunction with a reactive diamine such as diethyltoluene diamine and injected into highly rigid molds at high pressures. Prepolymers are generally not used in such systems except in minor amount, since in the very short period prior to gelation, the rapidly reacting mixture must traverse the entire, often complex mold. Thus, low viscosity systems are desired, in conjunction with very high pressure, short duration injection. RIM processes have acquired a separate status in the art. RIM system are not heat-cured, but rather rapidly cure without heat.

Toluene diisocyanate (TDI) based elastomers are the second major heat-cured elastomer class, and the largest class in terms of elastomer produced. Approximately 65 percent of heat-cured polyurethane elastomers are TDI-based systems. In practice, TDI-based prepolymers having high isocyanate group content are seldom used, and amine rather than diol chain extenders are employed to provide hard segments having urea linkages. The resulting elastomers are thus polyurethane/urea elastomers. High isocyanate group contents are generally avoided with TDI-based prepolymers due to the volatility of TDI.

Due to the limited NCO/OH ratio, the % NCO content of the isocyanate-terminated prepolymers derived from TDI is limited to a maximum of about 10% by weight. At such limited isocyanate contents, formulation flexibility is reduced. Moreover, as the urea hard segment content is related to the isocyanate group content in amine cured systems, preparation of elastomers with high tensile strength and other desirable physical properties is rendered more difficult.

Many attempts have been made to increase polyurethane elastomer physical properties, and many have been successful in elevating certain physical properties, but often at the expense of others. For example, in U.S. Pat. No. 4,934,425 the preparation of polyurethane/urea elastomers having improved dynamic properties is exemplified. The elastomers were prepared from TDI-based prepolymers containing a high molecular weight polytetramethylene ether glycol (PTMEG) of 2000 Da molecular weight and a moderate molecular weight PTMEG of 1000 Da molecular weight. Elastomers prepared from the blended prepolymers showed considerable improvement in resistance to heat build-up in rubber tire applications, indicative of lower hysteresis. However, while dynamic properties improved, no improvement was noted with respect to tensile strength, elongation, or hardness.

In U.S. Pat. No. 3,963,681 the preparation of polyurethane/urea elastomers with improved cut-growth and flex-crack resistance for tire applications is disclosed. The TDI-based prepolymers were prepared from a blend of a very high molecular weight PTMEG (molecular weight above 4500 Da) and a moderate molecular weight PTMEG, the blend having an average molecular weight of between 1000 Da and 4500 Da. The molecular weight of the higher molecular weight PTMEG is required to be higher than the "critical molecular weight" of PTMEG polymers, while the molecular weight of the lower molecular weight component must be less than this value. Tensile strengths as well as cut-growth were improved. However, not all polyether polyols are known to have a "critical molecular weight." Furthermore, the molecular weights are very critical; blends of 800 Da PTMEG and 3800 Da PTMEG are disclosed as being unsuitable, for example.

U.S. Pat. No. 5,077,371 addressed hardness build in polyurethane/urea cast elastomers. The rate of hardness build is important as cast elastomer parts cannot be demolded prior to developing adequate green strength without risk of damage to the parts. Rapid development of hardness allows more rapid demold. Cure can be completed in an oven outside the mold, and production rates increased correspondingly. The addition of the dimer of toluene diisocyanate (TDI dimer) in amounts of 0.3 to 6 weight percent of total isocyanate to the isocyanate component used to prepare bimodally distributed PTMEG prepolymers was found to increase the rate of hardness build. Unfortunately, of the remaining physical properties, hardness, elongation, and rebound remained virtually unchanged, tensile strength and particularly elongation actually decreased, and only tear strength showed significant improvement. The necessity of preparing the TDI dimer adds additional time and expense to elastomer formulation.

PTMEG has been traditionally used in preparing high performance polyurethane/urea elastomers, as illustrated by the three foregoing U.S. Pat. Nos. 4,934,425, 3,963,681, and 5,077,371. PTMEG is a premium priced polyol. However, PTMEG continues to be used today despite its much greater cost as compared to polyoxyalkylene polyols such as polyoxyethylene glycols and polyoxypropylene glycols, due to the desirable physical properties of the polyurethane which may be obtained through its use.

Moisture-cured polyurethane elastomers are often used as caulks and sealants. Rather than incorporating a diamine to react with isocyanate to form the linking urea hard segments, moisture-cured elastomers rely on the reaction of free isocyanate groups with moisture to form urea linkages. Many moisture-cured films and sealants exhibit relatively low physical properties, particularly tensile strength and/or tear strength, and therefore improvement in these and other properties is desired.

The majority of polyoxyalkylene polyether polyols are polymerized through base catalysis. For example, polyoxypropylene diols are prepared by the base catalyzed oxypropylation of a difunctional initiator such as propylene glycol. During base catalyzed oxypropylation, a competing rearrangement of propylene oxide to allyl alcohol continually introduces an unsaturated, monofunctional, oxyalkylatable species into the reactor. The oxyalkylation of this monofunctional species yields allyl-terminated polyoxypropylene monols. The rearrangement is discussed in Block and Graft Polymerization, Vol. 2, Ceresa, Ed., John Wiley & Sons, pp. 17–21. Unsaturation is measured in accordance with ASTM D-2849-69 "Testing Urethane Foam Polyol Raw Materials," and expressed as milliequivalents of unsaturation per gram of polyol (meq/g).

Due to the continual creation of allyl alcohol and its subsequent oxypropylation, the average functionality of the polyol mixture decreases and the molecular weight distribution broadens. Base-catalyzed polyoxyalkylene polyols contain considerable quantities of lower molecular weight, monofunctional species. In polyoxypropylene diols of 4000 Da molecular weight, the content of monofunctional species may lie between 30 and 40 mol percent. In such cases, the average functionality is lowered to c.a. 1.6 to 1.7 from the nominal, or theoretical functionality of 2.0. In addition, the polyols have a high polydispersity, $M_w/M_n$ due to the presence of the substantial, low molecular weight fractions. Molecular weights and equivalent weights herein in Da (Daltons) are number average molecular weights and number average equivalent weights, respectively, unless specified otherwise.

Some researchers in the past have suggested using low unsaturation, higher functionality polyols to improve elastomer physical properties. See, e.g. U.S. Pat. Nos. 4,239,879 and 5,100,997. For example, A. T. Chen et al., "Comparison of the Dynamic Properties of Polyurethane Elastomers Based on Low Unsaturation Polyoxypropylene Glycols and Poly(tetramethylene oxide) Glycols," Polyurethanes World Congress 1993, Oct. 10–13, 1993, pp. 388–399 compared the properties of PTMEG-derived elastomers with those from conventional polyoxypropylene diols and low unsaturation polyoxypropylene diols. In Shore A 90 cast elastomers, PTMEG-MDI pre-polymer-derived, butanediol extended polyurethane elastomers had slightly lower modulus and elongation than low unsaturation polyoxypropylene diol-derived elastomers, however tensile strength of the PTMEG elastomers was considerably higher. For polyurethane/urea cast elastomers, a direct comparison was not possible, as the only PTMEG example used a 1000 Da PTMEG while both low unsaturation polyoxypropylene diol examples employed c.a. 2000 Da molecular weight diols. The PTMEG example had considerably higher physical properties with the exception of elongation, which was to be expected. Notably, conventional, base-catalyzed polyoxypropylene diols produced polyurethane/urea cast elastomers with physical properties virtually indistinguishable from those prepared from low unsaturation diols.

Reducing unsaturation in polyoxyalkylene polyols by lowering catalyst concentration and decreasing the reaction temperature is not feasible, as the reaction rate is so slow that oxypropylation takes days or even weeks, although low unsaturation polyols may be prepared in this manner. Thus, efforts have been expended to discover catalysts which can produce polyoxypropylated products in a reasonable amount of time with little introduction of monofunctionality due to allylic species. In the early 1960's, for example, double metal cyanide catalysts such as zinc hexacyanocobaltate complexes were developed as illustrated by U.S. Pat. Nos. 3,427,256; 3,427,334; 3,427,335; 3,829,505; and 3,941,849. Despite lowering unsaturation to the range of c.a. 0.018 meq/g, the cost of these catalysts coupled with the necessity of lengthy and expensive catalyst removal steps prevented commercialization.

Use of alternative basic catalysts such as cesium hydroxide and rubidium hydroxide as disclosed in U.S. Pat. No. 3,393,243, and the barium and strontium oxides and hydroxides, as disclosed in U.S. Pat. Nos. 5,010,187 and 5,114,619, enabled modest improvements in unsaturation, however catalyst expense, and in some cases, toxicity, coupled with the but modest improvements offered, mitigated against commercialization. Catalysts such as calcium naphthenate and combinations of calcium naphthenate and tertiary amines have proven successful, as disclosed in U.S. Pat. Nos. 4,282,387, 4,687,851 and 5,010,117, in preparing polyols with unsaturations as low as 0.016 meq/g, and more generally in the range of 0.02 to 0.04 meq/g.

In the 1980's, double metal cyanide complex (DMC) catalysts were once more revisited, and improvements in catalytic activity and catalyst removal methods encouraged one manufacturer to offer DMC catalyzed polyols having unsaturations in the range of 0.015 to 0.018 meq/g commercially for a brief time. However, base catalysis continued to be the major method of preparing polyoxypropylene polyols, and continues its dominance to the present day.

Recently, however, further major advances in DMC catalysts and polyoxyalkylation processes by the ARCO Chemical Co. have enabled practical preparation of ultra low unsaturation polyoxypropylene polyols. High molecular weight polyols, for example those in the 4000 Da to 8000 Da molecular weight range, typically exhibit unsaturation in the range of 0.004 to 0.007 meq/g when catalyzed by the novel DMC catalysts. At these levels of unsaturation, the amount of monofunctional species is only 2 mol percent or less. Moreover, GPC analysis shows the polyols to be virtually monodisperse, often exhibiting polydispersities less than 1.10. Several such polyols have recently been commercialized as ACCLAIM™ polyols.

However, the advent of low unsaturation, higher functionality polyols has not proven to be the panacea those skilled in the art expected. In many systems, replacement of conventional polyols with very low unsaturation polyols causes system failure, and considerable efforts in reformulation must be expended. In other cases, the low unsaturation polyols could be readily substituted, but expected improvements did not materialize. The reasons for the unexpected difficulties associated with the use of low unsaturation polyols are not known with certainty.

However, the formulation of conventional polyurethane systems employs polyether polyols whose actual and theoretical functionality differ, often considerably. For example, a conventional, base-catalyzed 6000 Da triol may have an actual functionality of only c.a. 2.4 due to the presence of 30 to 40 mol percent monol. Substituting a polyol blend of a low unsaturation, high functionality diol and low unsaturation, high functionality triol to mimic the 2.4 functionality does not provide the same functionality distribution as the conventional polyol. The triol portion of the conventionally catalyzed triol produces three-way branched "crosslink" sites, while the monofunctional portion acts as a chain terminator. In a diol/triol blend having the same functionality, the number of three-way branched sites is less, but there are no monofunctional chain terminators.

Use of polyols having low content of monofunctional species has been suggested as a method of increasing polymer molecular weight; and increased polymer molecular weight has, in turn, sometimes been cited as desirable in producing higher performance polymers. However, high molecular weight is not necessarily a desirable feature in many polymer systems. As indicated by G. Odian, Principles of Polymerization, John Wiley & Sons, © 1981, pp. 20–21, for example, often, the molecular weight to be desired is a moderate rather than a high molecular weight. In engineering thermoplastics, for example, higher molecular weights in general increase tensile strength, melt temperature, modulus, and the like, but if the molecular weight is too high, polymer viscosity becomes too great to process. In polyurethanes, molecular weights are far lower than engineering thermoplastics, and polymer morphology and physical properties are influenced by many factors, including amount and nature of hard segment, stereochemistry of isocyanate used, etc. Often, formulations must be chosen to balance conflicting properties. For example, increases in tensile strength are often accompanied by a decrease in elongation.

For example, R. Mascioli, in "Urethane Applications for Novel High Molecular Weight Polyols," 32nd Annual Polyurethane Technical/Marketing Conference, Oct. 1–4, 1989, pp. 139–142, discloses that the substitution of a low unsaturation, 10–11,000 Da triol for a conventional 6000 Da triol in a polyurethane foam formulation resulted in a foam which was stiff and boardy. A softer foam would have been expected, due both to the longer, and therefore more flexible, polyoxypropylene branch length of the triol; and a lower crosslink density. Substitution of higher molecular weight, low unsaturation polyols for conventionally catalyzed polyols whose molecular weight is limited, has also been touted as a means of using less of the more expensive isocyanate in polyurethane manufacture. However, suitable formulations must be developed.

In the area of high resilience polyurethane flexible foams, it has been discovered, as disclosed in copending U.S. application Ser. No. 08/565,516, that substitution of a DMC-catalyzed, low unsaturation polyol for a conventionally, base catalyzed polyol of similar molecular weight and composition in a high resilience polyurethane foam system may result in foam collapse. It is now believed by some that this anomalous behavior may be due to a very small amount of a very high molecular weight component, with a molecular weight in the range of 100,000 Da and higher. This exceptionally high molecular weight component, even though very small in amount, may act as a surfactant and tend to destabilize polyurethane foam, or may serve to increase viscosity, thereby interfering with normal curing mechanisms such as hard segment phase out.

Therefore, the formulation of polyurethane systems which can extol the benefits of the higher molecular weights, higher functionalities, low poly-dispersity, and lower unsaturation and attendant lack of monofunctional species exhibited by low unsaturation polyols such as those prepared through DMC catalysis requires non-obvious and unorthodox reformulation.

SUMMARY OF THE INVENTION

The present invention pertains to polyurethane and polyurethane/urea elastomers prepared by chain extension or moisture cure of isocyanate-terminated prepolymers or quasi-prepolymers prepared by reacting a di- or polyisocyanate other than toluene diisocyanate with a mixture containing a high molecular weight, very low unsaturation polyoxypropylene diol and a low molecular weight diol, the mixture having a hydroxyl number between 50 and 200. The chain-extended, cured elastomers surprisingly have improved hardness, resilience, tear strength, and compression set compared with elastomers having similar hard segment content prepared from a prepolymer utilizing a single polyol of equivalent hydroxyl number. The moisture-cured elastomers exhibit exceptional tensile and tear strengths.

DESCRIPTION OF THE PREFERRED EMBODIMENTS

The subject invention chain-extended elastomers are prepared by reacting the isocyanate-terminated prepolymer or quasi-prepolymer described hereafter with a chain extender at an isocyanate index of from about 90 to about 120, preferably 95 to 110, and most preferably 100–105. As is well known, the isocyanate index is the ratio of equivalents of isocyanate to equivalents of isocyanate reactive species multiplied by 100. In determining the equivalents of isocyanate reactive species, one mole of hydroxyl or amino groups constitutes one equivalent. The moisture-cured elastomers are cured in the presence of atmospheric moisture or in a humidifying chamber.

The chain-extended cast elastomers are processed by intensively mixing the prepolymer-containing A-side and diol or diamine-containing B-side, degassing under vacuum if necessary, and introducing the mixture into an open or closed mold. The elastomers may be removed from the mold following development of sufficient green strength to allow demolding and handling, and are generally post-cured at slightly elevated temperature. Alternatively, the elastomer may be subjected to cure in the mold itself. Methods of preparing the elastomer per se are conventional, and reference may be made to the appropriate portions of Polyurethane: Chemistry and Technology, J. H. Saunders and K. C. Frisch, Interscience Publishers, New York, 1963; and to the Polyurethane Handbook, Gunter Oertel, Ed., Hanser Publishers, Munich, © 1985, both of which are incorporated herein by reference. The moisture-cured elastomers may be formulated with traditional fillers, rheology control agents, thixotropes, and the like, or may be extruded or cast as neat films or from solution.

The isocyanate-terminated prepolymers are prepared by reacting a di- or polyisocyanate other than toluene diisocyanate with a polyol component as described below. The prepolymers preferably have an NCO group content of from about 2 to about 12 weight percent.

Suitable di- or polyisocyanates for use in the invention are aromatic, aliphatic, and cycloaliphatic varieties commonly known to those skilled in the art, excluding toluene diisocyanates. Examples include 2,2'-, 2,4'-, or 4,4'-methylenediphenylene diisocyanate (MDI), polymeric MDIs, MDI variants, carbodiimide-modified MDIs, modified di- and polyisocyanates (urea-, biuret-, urethane-, isocyanurate-, allophanate-, carbodiimide-, or uretdione-modified, etc.), hydrogenated MDIs, p-phenylene diisocyanate, TMXDI, isophorone diisocyanate, 1,4-diisocyanatobutane, 1,4-cyclohexanediisocyanate, hexamethylene diisocyanate, and the like, and mixtures thereof. It is also preferable to use commercially available isomers or their mixtures for reasons of economy.

In addition to the prepolymer approach, a quasi-prepolymer method can be used to make the elastomers of the invention. Quasi-prepolymers are made from an excess of the di- or polyisocyanate and a reduced proportion of the polyol component in the same manner as described herein for making prepolymers. Due to the lesser amount of polyol component to isocyanate, however, the % NCO contents of quasi-prepolymers are higher than the % NCO of prepolymers. Isocyanate group contents of from 12 wt. % NCO to 30 wt. % NCO are suitable, for example. Any remaining polyol needed can be introduced together with the chain extender as a blend or in separate streams.

The polyol component to be reacted with the di- or polyisocyanate to form the prepolymer or quasi-prepolymer is a mixture of at least two hydroxyl-functional components, the first being a low molecular weight diol having a molecular weight less than about 400 Da, the second being a low unsaturation polyoxypropylene glycol having a molecular weight of c.a. 2000 Da or higher, such that the mixture of the at least two components has a hydroxyl number in the range of about 50 to about 200.

The low molecular weight diol may be any dihydroxyl functional compound having a molecular weight below about 400 Da. Illustrative, but non-limiting examples, include ethylene glycol, diethylene glycol, triethylene glycol, propylene glycol, dipropylene glycol, tripropylene glycol, 1,3-propanediol, 2-methyl-1,3-propane diol, neopentyl glycol, 1,3- and 2,3-butylene glycol, 1,4-butanediol, 1,5-pentanediol, 1,6-hexanediol, 1,8-octanediol, 1,4-cyclohexanediol, 1,4-cyclohexanedimethanol, hydroquinone bis[2-hydroxyethyl ether], and the various bisphenols and their bis[hydroxyalkyl ether] derivatives. Oxyalkylation products of the above are also useful. Preferably, the low molecular weight diol has a molecular weight below about 200 Da. Mixtures of one or more of such low molecular weight diols are also useful. Minor quantities of low molecular weight trials, tetrols or the like, such as glycerine, trimethylol propane, pentaerythritol, or the like may be added to the low molecular weight diol mixture as long as the amount of trial, tetrol, or higher functionality species is about 10 mol percent or less. "Low molecular weight diol" allows such amounts of higher functional species unless indicated otherwise.

The low unsaturation polyoxypropylene glycol has a molecular weight of about 2000 Da or higher, preferably from 2000 Da to 12,000 Da, more preferably from 3000 Da to 10,000 Da, and most preferably from 4000 Da to 8000 Da. The unsaturation must be below 0.020 meq/g, is preferably below 0.015 meq/g, and most preferably below 0.010 meq/g. Unsaturation of from about 0.002 meq/g to about 0.007 meq/g is preferred. To achieve the requisite low unsaturation, any catalytic method which is useful for obtaining the desired molecular weight and unsaturation may be used. However, it is desirable to employ double metal cyanide complex catalysts as the oxyalkylation catalyst. Catalysts of this type are disclosed in U.S. Pat. Nos. 5,470,813 and 5,482,908, for example, and are capable of preparing polyols in the molecular weight range of 2000 Da to 12,000 Da with unsaturation typically in the range of about 0.004 to 0.007 meq/g. More than one low unsaturation polyoxypropylene diol may be used in admixture with the low molecular weight diol components.

The blend of low molecular weight diol and low unsaturation polyoxypropylene diol must have a hydroxyl number between 50 and 200, preferably between 75 and 150, and most preferably in the range of 90 to 120. Hydroxyl number is calculated by adding the weight fractional hydroxyl numbers of the individual components of the mixture, the weight fractional hydroxyl number being the weight fraction of the component multiplied by the component's hydroxyl number. It must be emphasized that it is the blend of high molecular weight species and low molecular weight species used to prepare the prepolymer which provides the exceptional qualities of the subject invention cast elastomers. These properties cannot be duplicated with single components, nor with bimodal blends not containing species below about 400 Da molecular weight.

Preparation of the prepolymer is by standard techniques. For example, the polyol component and isocyanate component may be mixed thoroughly, generally under a nitrogen blanket, and agitated until the isocyanate group content drops to a steady value, indicating that the reaction is finished. The mixture is advantageously modestly heated, for example to temperatures in the range of 50° C. to 70° C. Urethane reaction-promoting catalysts such as the various well known tin catalysts, amine catalysts, or other catalysts which promote the reaction between isocyanate and hydroxyl groups may be used if desired. The reaction may be batch, semibatch, or continuous. Examples of prepolymer preparation may be found in Polyurethane: Chemistry and Technology, Polyurethanes Handbook, in U.S. Pat. No. 5,278,274, and, Canadian Published Application 2,088,521, which are herein incorporated by reference.

Chain extenders useful in the subject invention are the conventional diol and diamine chain extenders known to those skilled in the art. Suitable diol chain extenders include, for example, ethylene glycol, 1,4-butanediol, 1,3-propanediol, 1,5-pentanediol, neopentyl glycol, 2-methyl-1,3-propanediol, diethylene glycol, tripropylene glycol, and the like, and mixtures thereof. Suitable diamine chain extenders include aliphatic and aromatic diamines. Preferred diamines are the sterically hindered or electrically deactivated aromatic diamines. Examples of these are the various ring alkylated toluene diamines, methylenedianilines such as 3,5-diethyltoluenediamine (DETA) and like compounds such as those disclosed in U.S. Pat. No. 4,218,543. Examples of aromatic diamines which are rendered less active by electrical effects of ring substituents include 4,4'-methylene-bis(2-chloroaniline) (MOCA or MbOCA) and 4,4-methylene-bis(3-chloro-2,6-diethylaniline) (MCDEA). Diamines without steric hindrance or ring deactivating groups may react too rapidly and cause insufficient pot life to fill the mold, particularly when complex molds are used. The chain extender component may include minor amounts of crosslinkers such as diethanolamine, triethanolamine, and the like.

Catalysts may also be useful in certain systems. Catalysts have been described previously with respect to prepolymer formation, and suitable catalysts are well known to those skilled in the art. Many examples of suitable catalysts may be found in the Polyurethane Handbook, Pp. 90–95, and Polyurethanes: Chemistry and Technology, Pp. 129–217, both incorporated herein by reference.

Conventional additives and auxiliaries may be added as well, including but not limited to fillers, plasticizers, dyes, pigments, UV stabilizers, thermal stabilizers, antioxidants, flame retardants, conductivity agents, internal mold release agents, blowing agents, and the like. When a blowing agent is included, the product is a microcellular elastomer. Suitable blowing agents include reactive ones, such as water, and physical ones, such as volatile hydrocarbons, CFCs, and the like. Mixtures of reactive and physical blowing agents can be used. Polymer solids, for example, vinyl polymer solids as found in polymer polyols and isocyanate-derived solids such as those found in PIPA and PHD polyols may be included as well, for example by using an appropriate polymer polyol dispersion having as its "base," or "carrier" polyol, a low unsaturation polyoxypropylene diol. If the amount of polymer solids desired is low, a minor quantity of high solids polymer polyol dispersion prepared from a conventionally catalyzed polyol may be used.

The polyoxypropylene diol may contain oxyethylene moieties, introduced, for example, by the random copolymerization or capping with ethylene oxide along with propylene oxide during preparation of the polyol. The amount of ethylene oxide should generally be 40 weight percent or less, preferably less than 20 weight percent, and more preferably about 5 to about 15 weight percent. If the polyoxypropylene diols containing oxyethylene moieties are to be prepared using double metal cyanide complex catalysis, it is preferred that the ethylene oxide be present during a substantial portion of the oxypropylation.

The polyoxypropylene diol may also contain minor amounts of higher alkylene oxides, particularly oxetane, 2,3-butylene oxide, 1,2-butylene oxide, and the like. The amount of higher alkylene oxide should generally be limited to less than about 10 weight percent. Most preferably, the polyoxypropylene diol contains substantially all oxypropylene moieties, or oxypropylene moieties with not more than about 10 weight percent random oxyethylene moieties. The low unsaturation polyoxypropylene diol may also contain a minor amount of a conventionally, base-catalyzed polyoxypropylene diol, provided that the amount of such conventional diol not exceed 20 mol percent of the total high molecular weight diol, and the unsaturation of the high molecular weight portion of the diol mixture be less than 0.020 meq/g, preferably less than 0.015 meq/g.

Having generally described this invention, a further understanding can be obtained by reference to certain specific examples which are provided herein for purposes of illustration only and are not intended to be limiting unless otherwise specified.

EXAMPLE 1 and

Comparative Example C1

Moisture-cured films are prepared by casting neat isocyanate-terminated prepolymers onto a glass plate at a thickness of 30 mils and curing in the presence of atmospheric moisture for a period of 24 hours. The films are cured and conditioned at 73° F. (23° C.) and 50% relative humidity for at least four weeks prior to testing.

In Example 1, ACCLAIM 3201 polyether diol, a low unsaturation polyoxypropylene diol having a molecular weight of about 3200 Da and available from ARCO Chemical Company, is blended with diethylene glycol (DEG) (molecular weight 116 Da) to produce a blend having an average molecular weight of c.a. 1000 Da. The polyol/glycol mixture is then combined with trimethylolpropane (TMP) (5:1 equivalent ratio of polyol to TMP) and reacted with isophorone diisocyanate at a 2:1 NCO/OH mole ratio to give an isocyanate-terminated prepolymer having a free NCO content of about 6 wt. %. The prepolymer is moisture cured as described above.

In Comparative Example C1, ARCOL PPG-1025, a conventional 1000 mol. wt. polyoxypropylene diol, is used in place of the ACCLAIM 3201 diol/DEG blend. The polyol is combined with TMP (5:1 equivalent ratio of polyol to TMP) and reacted with isophorone diisocyanate at a 2:1 NCO/OH mole ratio to give an isocyanate-terminated prepolymer having a free NCO content of about 6 wt. %. The prepolymer is moisture cured as described above.

As Table 1 shows, the moisture-cured polyurethane based on the blend of ACCLAIM 3201 diol and DEG has much better overall physical properties, including higher tensile strength, modulus, elongation, and tear strength.

TABLE 1

| EXAMPLE | 1 | C1 |
|---|---|---|
| Prepolymer Polyol: | ACCLAIM ™ 3201 diol/diethylene glycol | ARCOL 4 PPG-1025 |
| Physical Properties: | | |
| 100% Modulus (psi) | 920 | 355 |
| 300% Modulus (psi) | 1920 | 1000 |
| Tensile Strength (psi) | 5600 | 3700 |
| Elongation (%) | 520 | 500 |
| Tear Strength (psi) | 420 | 220 |

EXAMPLES 2–3 and

Comparative Examples 2–3

Elastomers based on a mixture of 4,4'-MDI and carbodiimide (CD)-modified MDI are prepared using a quasi-prepolymer technique as follows.

The isocyanate mixture is combined with a polyol at a 5.67 NCO/OH equivalent ratio to give a quasi-prepolymer having 16 wt. % free NCO content. In Examples 2 and 3, the polyol is a mixture of ACCLAIM 4200 polyether polyol (a low unsaturation polyoxypropylene diol having a molecular weight of about 4000 Da and available from ARCO Chemical Company) combined with tripropylene glycol (TPG). In Comparative Examples 2 and 3, the polyol is PPG 1025 diol (a conventional 1000 mol. wt. polyoxypropylene diol).

The quasi-prepolymer prepared above is used to make elastomers having 35% (Example 2 and Comparative Example 2) or 25% (Example 3 and Comparative Example 3) hard segment contents. Each quasi-prepolymer is chain extended in the presence of dibutyltin dilaurate catalyst with a mixture of 1,4-butanediol and ACCLAIM 4220 diol (low unsaturation, EO-capped polyoxypropylene diol of about 4000 mol. wt.). The ratio of 1,4-butanediol and ACCLAIM 4220 diol is adjusted as shown in Table 2 to vary the hard segment content of the elastomer. The amount of tin catalyst used is adjusted to give a potlife of about 90 seconds and a demold time of about 22 minutes.

TABLE 2

| EXAMPLE | 2 | C2 | 3 | C3 |
|---|---|---|---|---|
| Quasi-prepolymer (g) | | | | |
| (16% NCO content) | | | | |
| MDI | 50.1 | 50.1 | 50.1 | 50.1 |
| CD-modified MDI | 8.84 | 8.84 | 8.84 | 8.84 |
| PPG 1025 diol | 0 | 41.1 | 0 | 41.1 |
| ACCLAIM 4200/TPG | 34.9/6.15 | 0 | 34.9/6.15 | 0 |
| NCO/OH | 5.67 | 5.67 | 5.67 | 5.67 |
| Elastomer formulation (g) | | | | |
| Quasi-prepolymer | 88.4 | 88.4 | 64.7 | 64.7 |
| 1,4-butanediol | 12.6 | 12.6 | 8.04 | 8.04 |
| ACCLAIM 4220 | 84.0 | 84.0 | 112 | 112 |
| % Hard segment | 35 | 35 | 25 | 25 |

TABLE 2-continued

| EXAMPLE | 2 | C2 | 3 | C3 |
|---|---|---|---|---|
| Physical Properties: | | | | |
| Hardness (Shore A) | 83 | 80 | 66 | 63 |
| 100% Modulus (psi) | 737 | 630 | 350 | 260 |
| Resilience | 60 | 57 | 67 | 65 |
| Tensile Strength (psi) | 3245 | 3160 | 2300 | 2500 |
| Compression Set (%) | 28 | 36 | 25 | 39 |
| Tear Strength (psi) | 428 | 378 | 285 | 218 |

Table 2 summarizes the formulations and results of physical testing of the elastomers. As the table shows, elastomers from quasi-prepolymers based on mixtures of a high-molecular-weight, low-unsaturation polyether diol and a diol chain extender have superior hardness, resilience, tear strength, and compression set compared with similar elastomers where the quasi-prepolymer is made from a single, conventional 1000 mol. wt. polyether diol.

Having now fully described the invention, it will be apparent to one of ordinary skill in the art that many changes and modifications can be made thereto without departing from the spirit or scope of the invention as set forth herein.

What is claimed is:

1. A polyurethane elastomer comprising the reaction product of:
    a) an isocyanate-terminated prepolymer or quasi-prepolymer prepared by the reaction of a stoichiometric excess of a di- or polyisocyanate other than toluene diisocyanate with an isocyanate-reactive component comprising first and second polyol components a)i) and a)ii, wherein
        a)i) comprises one or more high molecular weight polyoxypropylene diols having an unsaturation of about 0.02 meq/g or less and a molecular weight of about 2000 Da or more; and
        a)ii) comprises one or more low molecular weight diols having a molecular weight of about 400 Da or less, such that the hydroxyl number of said isocyanate-reactive component is in the range of 75 to 200; and
    b) a diol chain extender; at an isocyanate index of from about 85 to 115.

2. The elastomer of claim 1 wherein said prepolymer has an NCO group content of from about 2 weight percent to about 12 weight percent.

3. The elastomer of claim 1 wherein at least one of said low molecular weight diols has a molecular weight of about 200 Da or less.

4. The elastomer of claim 3 wherein said low molecular weight diol is selected from the group consisting of ethylene glycol, propylene glycol, diethylene glycol, dipropylene glycol, triethylene glycol, tripropylene glycol, 2-methyl-1,3-propanediol, and mixtures thereof.

5. The elastomer of claim 1 wherein at least one of said one or more high molecular weight polyoxypropylene diols has an unsaturation of about 0.015 meq/g or less, and a molecular weight of from 3000 Da to 8000 Da.

6. The elastomer of claim 1 wherein the hydroxyl number of the polyol component is in the range of from about 75 to about 150.

7. The elastomer of claim 1 wherein the hydroxyl number of the polyol component is in the range of from about 90 to about 120.

8. The elastomer of claim 1 wherein 70 mol percent or more of polyol component a)i) has an unsaturation of about 0.01 meq/g or less.

9. The elastomer of claim 1 wherein said chain extender has at least one diol chain extender and is selected from the group consisting of 1,4-butanediol, ethylene glycol, neopentyl glycol, and 2-methyl-1,3-propanediol.

10. The elastomer of claim 1 wherein said isocyanate-reactive component further comprises a)iii) not more than 10 equivalent percent, based on the sum of equivalents of a)i) and a)ii), of a low molecular weight triol or tetrol having a molecular weight below 400 Da.

11. The elastomer of claim 1, further including with said chain extender b) a low unsaturation polyoxypropylene diol (c) having an unsaturation of less than 0.02 meq/g and a molecular weight greater than 2000 Da.

12. The elastomer of claim 11, wherein said low unsaturation polyoxypropylene diol (c) has an unsaturation less than 0.01 meq/g.

13. The elastomer of claim 12, wherein said low unsaturation polyoxypropylene diol (c) has a molecular weight of about 4000 Da or more.

14. A microcellular elastomer of claim 1.

15. A method of preparing polyurethane elastomers exhibiting improved properties, comprising reacting:
    a) an isocyanate-terminated prepolymer or quasi-prepolymer prepared by the reaction of a stoichiometric excess of a di- or polyisocyanate other than toluene diisocyanate with an isocyanate-reactive component comprising first and second polyol components a) i) and a)ii), wherein:
        a) i) comprises one or more high molecular weight polyoxypropylene diols having an unsaturation of about 0.02 meq/g or less and a molecular weight of about 2000 Da or more; and
        a) ii) comprises one or more low molecular weight diols having a molecular weight of about 400 Da or less, such that the hydroxyl number of said polyol component is in the range of 50 to 200; and
    b) a diol chain extender; at an isocyanate index of from about 85 to 115.

16. The method of claim 15 wherein said prepolymer has an NCO group content of from about 2 weight percent to about 12 weight percent.

17. The method of claim 15 wherein at least one of said low molecular weight diols has a molecular weight of about 200 Da or less.

18. The method of claim 17 wherein said low molecular weight diol is selected from the group consisting of ethylene glycol, propylene glycol, diethylene glycol, dipropylene glycol, triethylene glycol, tripropylene glycol, 2-methyl-1,3-propanediol, and mixtures thereof.

19. The method of claim 15 wherein at least one of said one or more high molecular weight polyoxypropylene diols has an unsaturation of about 0.015 meq/g or less, and a molecular weight of from 3000 Da to 8000 Da.

20. The method of claim 15 wherein the hydroxyl number of the polyol component is in the range of from about 75 to about 150.

21. The method of claim 15 wherein the hydroxyl number of the polyol component is in the range of from about 90 to about 120.

22. The method of claim 15 wherein 70 mol percent or more of the polyol component a)i) has an unsaturation of about 0.01 meq/g or less.

23. The method of claim 15 wherein said chain extender is selected from the group consisting of 1,4-butanediol, ethylene glycol, neopentyl glycol, and 2-methyl-1,3-propanediol.

24. The method of claim 15 wherein the reaction is performed in the presence of water, a physical blowing agent, or mixtures thereof, to produce a microcellular elastomer.

25. A moisture-cured elastomer comprising the reaction product of:
  a) an isocyanate-terminated prepolymer having an NCO group content of from about 2 weight percent to about 12 weight percent, prepared by the reaction of a stoichiometric excess of a di- or polyisocyanate other than toluene diisocyanate with a polyol component comprising:
    a)i) one or more high molecular weight polyoxypropylene diols having an unsaturation of about 0.02 meq/g or less and a molecular weight of about 2000 Da or more; and
    a)ii) one or more low molecular weight diols having a molecular weight of about 400 Da or less, such that the hydroxyl number of said polyol component is in the range of 75 to 200; and
  b) water vapor.

26. The elastomer of claim 25 wherein at least one of said low molecular weight diols has a molecular weight of about 200 Da or less.

27. The elastomer of claim 25 wherein said low molecular weight diol is selected from the group consisting of ethylene glycol, propylene glycol, diethylene glycol, dipropylene glycol, triethylene glycol, tripropylene glycol, 2-methyl-1,3-propanediol, and mixtures thereof.

28. A polyurethane elastomer comprising the reaction product of:
  a) an isocyanate-terminated prepolymer or quasi-prepolymer prepared by the reaction of a stoichiometric excess of a di- or polyisocyanate other than toluene diisocyanate with an isocyanate-reactive component comprising polyol components a)i) and a)ii, wherein:
    a)i) comprises one or more high molecular weight polyoxypropylene diols having an unsaturation of less than 0.01 meq/g and a molecular weight of about 2000 Da or more; and
    a)ii) comprises one or more low molecular weight diols having a molecular weight of about 400 Da or less, and
    a)iii) not more than 10 equivalent percent based on the sum of equivalents of a)i) and a)ii) of a low molecular weight triol or tetrol having a molecular weight less than 400 Da; such that the hydroxyl number of said isocyanate-reactive component is in the range of 50 to 200; and
  b) a diol chain extender; at an isocyanate index of from about 85 to 115.

* * * * *